United States Patent
Mailaender

(10) Patent No.: US 7,040,597 B2
(45) Date of Patent: May 9, 2006

(54) HOUSING FOR A MAGNET VALVE

(75) Inventor: Wolfgang Mailaender, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 10/782,911

(22) Filed: Feb. 23, 2004

(65) Prior Publication Data
US 2004/0164829 A1    Aug. 26, 2004

(30) Foreign Application Priority Data
Feb. 25, 2003   (DE) ............... 103 07 860

(51) Int. Cl.
*F16K 31/02* (2006.01)

(52) U.S. Cl. .............. 251/129.15; 137/884; 303/119.3; 335/282

(58) Field of Classification Search ........... 251/129.01, 251/129.15, 366; 137/884; 303/119.1, 119.2, 303/119.3; 335/281, 282
See application file for complete search history.

(56) References Cited

U.S. PATENT DOCUMENTS

| 3,079,947 A | 3/1963 | Hunt et al. |
| 5,903,070 A * | 5/1999 | Gobel .......................... 310/17 |
| 6,234,199 B1 * | 5/2001 | Nohira ....................... 137/557 |
| 6,322,048 B1 * | 11/2001 | Gramann et al. ......... 251/129.1 |

FOREIGN PATENT DOCUMENTS

| DE | 32 08 348 A1 | 12/1982 |
| DE | 90 17 109 | 5/1992 |
| EP | 1 225 380 A1 | 7/2002 |
| EP | 1 251 052 A2 | 10/2002 |
| GB | 2 098 805 A | 11/1982 |

* cited by examiner

*Primary Examiner*—Edward K. Look
*Assistant Examiner*—John K. Fristoe, Jr.
(74) *Attorney, Agent, or Firm*—Ronald E. Greigg

(57) ABSTRACT

A housing for a magnet valve has a hollow-body-like shape including a generally cylindrical sidewall having regions of different wall thickness.

9 Claims, 2 Drawing Sheets

HOUSING FOR A MAGNET VALVE

BACKGROUND OF THE INVENTION

1. Field of the Invention

The present invention relates to a housing for a magnet valve.

2. Description of the Invention

Electromagnetically actuated valves are known in various versions for various intended uses, for instance in motor vehicles as a pressure regulating valve for automatic transmissions, or as fuel injection valves. Such valves include a tubular housing in which a magnet coil is disposed. The wall thickness of the tubular housing is determined by the requisite magnetic flux. Often, so-called magnet arrays are also used in hydraulic applications in motor vehicles, such as for anti-lock braking systems, traction control systems, or electrohydraulic brake systems, in which a plurality of magnet valves are arranged in an array. In such arrays, each magnet valve has a tubular housing, with the diameters of the valves determining the structural size of the magnet array.

OBJECT AND SUMMARY OF THE INVENTION

The housing according to the invention for a magnet valve has the advantage over the prior art of making a reduced structural size possible. This is a particular advantage when used in magnet arrays. To that end, the housing of the invention, on the order of a hollow body, has different wall thicknesses along its circumference. Moreover, this leads to a reduction in the weight of the housing. Since the housing has both regions of lesser wall thicknesses and regions of greater wall thicknesses, the magnetic flux is not throttled by the reduced wall thickness, since the housing wall thickness is increased at another point to compensate.

Preferably, the wall thickness of the housing varies continuously from the thicker regions to the thinner regions. Such a housing can be achieved by means of deep drawing, for instance by one additional deep drawing operation, or by drawing once or multiple times through narrower dies.

To make it especially simple and economical to produce and versatile in use, the housing is preferably embodied symmetrically. Especially preferably, the wall thickness of the housing is reduced at two opposed regions. To make it as versatile in use as possible, the wall thickness of the housing is furthermore preferably reduced in four regions, with two regions each of reduced wall thickness facing one another.

For the sake of a simple way of fastening the magnet coil, the housing is preferably embodied as essentially cup-shaped. Also preferably it can be bent over inward.

A magnet array comprising a plurality of magnet units is preferably constructed such that adjacent housings touch at the regions of reduced wall thickness. As a result, in comparison to the prior art, significantly reduced dimensions and weights can be attained. A magnet array then has essentially a rectangular outer circumference.

Especially preferably, each housing includes at least two regions of reduced wall thickness, and the housings are then put together to make a magnet array such that each housing is in contact, with its at least two regions of reduced wall thickness, with regions of reduced wall thickness of adjacent housings.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
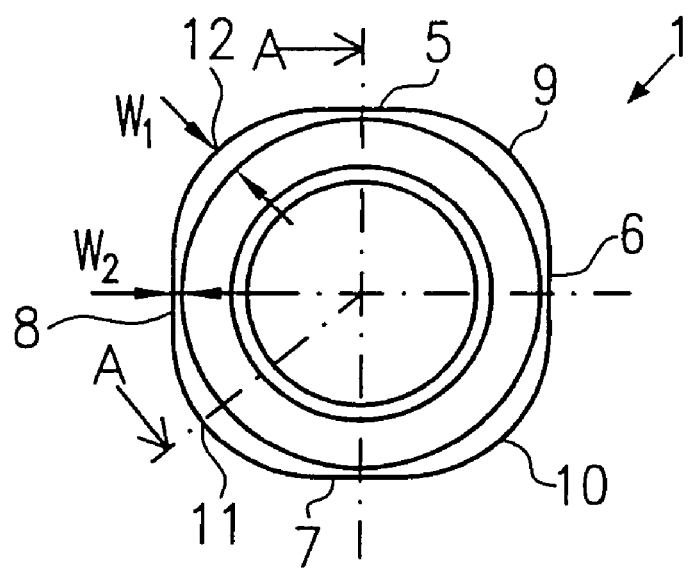
FIG. 1 is a schematic plan view on a housing for a magnet valve in an exemplary embodiment of the invention.
Figure 2:
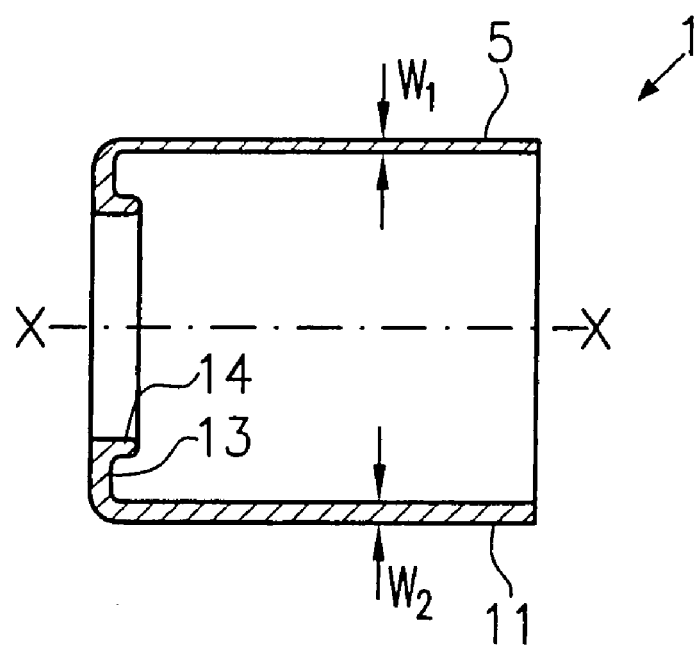
FIG. 2 is a sectional view taken along the line A—A of FIG. 1.

As can be seen from FIGS. 1 and 2, the magnet housing 1 regarding to the invention is embodied as essentially tubular. The housing 1 includes four regions of reduced wall thickness, which are identified by reference numerals 5, 6, 7 and 8. The housing 1 also includes four regions of increased wall thickness, which are identified by reference numerals 9, 10, 11 and 12. The regions 5, 6, 7, 8 of reduced wall thickness each have a wall thickness $W_2$, while the regions 9, 10, 11, 12 of increased wall thickness have a wall thickness $W_1$. The housing 1 is embodied symmetrically with two regions of reduced wall thickness face one another in substantially diametrically opposed relation and two other regions of increased wall thickness similarly face one another. In a view from outside, the housing 1 thus has a flattened shape in the regions 5, 6, 7, 8 of reduced wall thickness.

As shown in FIG. 2, the housing 1, on an end located in the axial direction X—X, has a region 14 that is bent over inward, creating a region 13 for receiving a magnet coil, not shown. The housing 1 of the invention can be produced for instance by means of deep drawing, and the regions of reduced wall thickness can be obtained by means of drawing once or multiple times through narrower dies.

Figure 3:
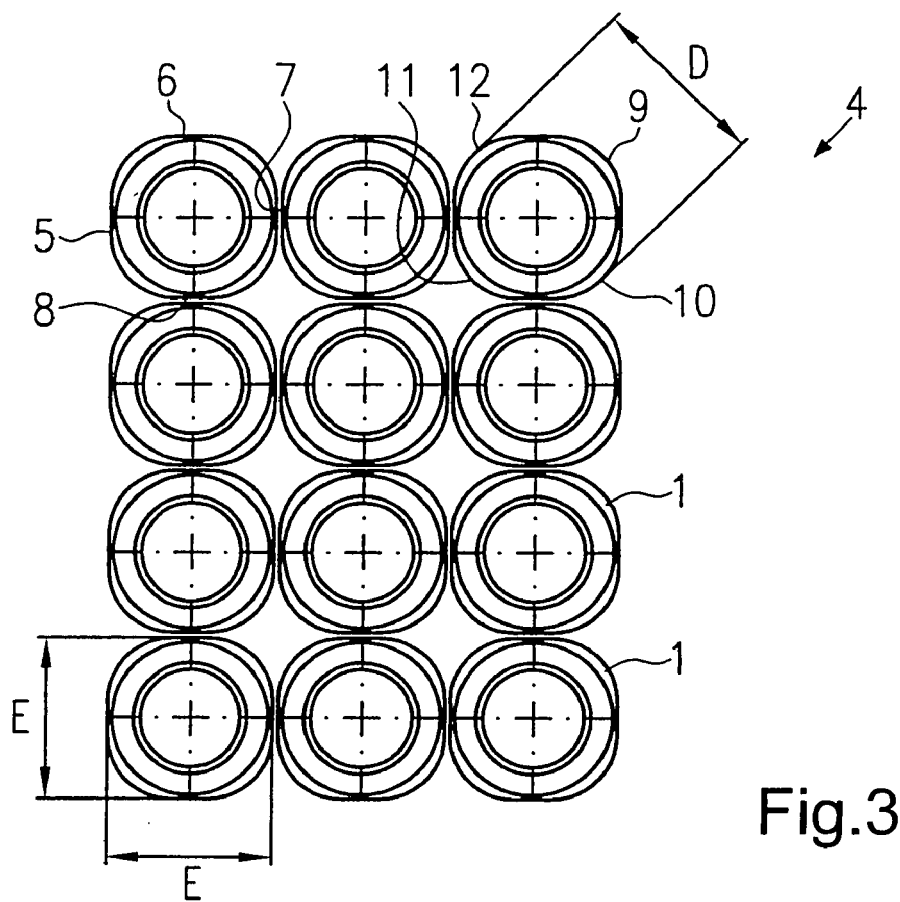
FIG. 3 is a schematic plan view on a magnet array comprising a plurality of housings.
Figure 4:
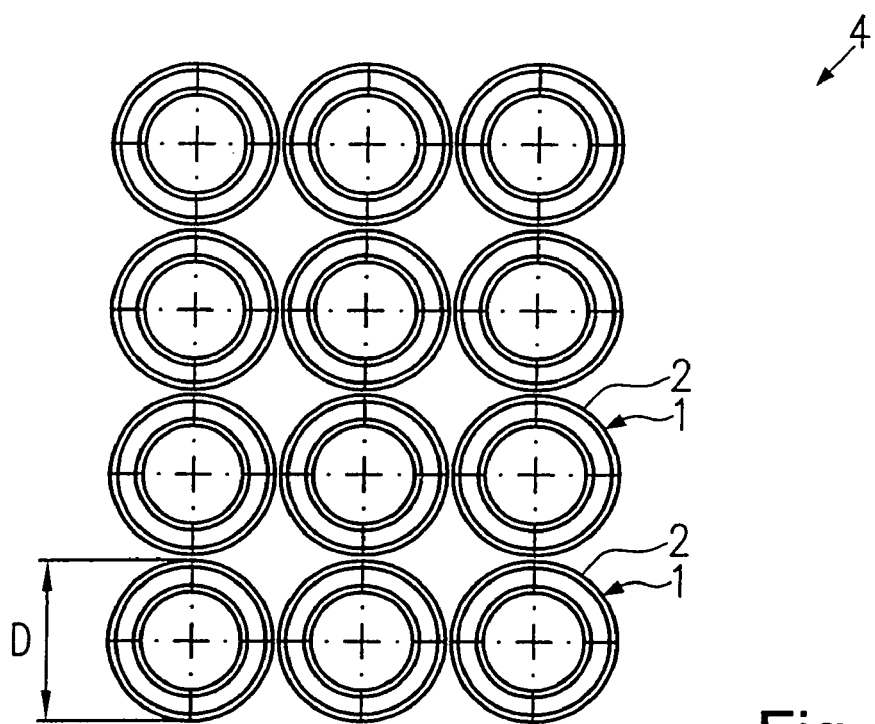
FIG. 4 shows a magnet array in accordance with the prior art.

FIG. 3 shows a special application of the housing 1 of the invention; in FIG. 3, a magnet array 4 is formed of twelve housings 1. At the flattened regions 5, 6, 7, 8, the housing 1 has a thickness E. At the regions 9, 10, 11, 12 of increased diameter, the housing a diameter D, and the diameter D is greater than the thickness E. The housings 1 are disposed such that the magnet array has an essentially rectangular outer circumference. The housings 1 are furthermore disposed such that housings immediately adjacent one another touch at the regions of reduced wall thickness. As a result, a more closely packed arrangement of housings in the magnet array can be achieved. Thus the structural size of such a magnet array can be reduced to the dimensions 4E×3E, and the weight can be reduced as well.

Such magnet arrays are used for instance in anti-lock brake systems (ABS), traction control systems (ASR), or electrohydraulic brake systems (EHB).

The foregoing relates to a preferred exemplary embodiment of the invention, it being understood that other variants and embodiments thereof are possible within the spirit and scope of the invention, the latter being defined by the appended claims.

I claim:

1. A magnet array, comprising a plurality of magnet valve housings, in which the housings are disposed such that adjacent housings are in contact with one another, each housing comprising a hollow-body-like shape defined by a generally tubular sidewall having regions of different wall thickness extending axially of the housing and wherein each housing comprises at least two regions of reduced wall thickness, and the housings are disposed to make up a magnet array in such a way that each housing is in contact with at least two housings in regions of reduced wall thickness.

2. The magnet array in accordance with claim 1, wherein the wall thickness of each housing varies continuously between a maximum wall thickness ($W_1$) and a minimum wall thickness ($W_2$).

3. The magnet array in accordance with claim 2, wherein each housing is embodied symmetrically.

4. The magnet array in accordance with claim 3, wherein each housing (1) comprises a reduced wall thickness in two regions facing one another.

5. The magnet array in accordance with claim 3, wherein each housing comprises four regions (5, 6, 7, 8) of reduced wall thickness, and wherein two regions of reduced wall thickness each face one another.

6. The magnet array in accordance with claim 1, wherein each housing (1) comprises a reduced wall thickness in two regions facing one another.

7. The magnet array in accordance with claim 1, wherein each housing comprises four regions (5, 6, 7, 8) of reduced wall thickness, and wherein two regions of reduced wall thickness each face one another.

8. The magnet array in accordance with claim 1, wherein each housing is embodied as essentially cup-shaped.

9. The magnet array of claim 1, wherein the housings (1) are disposed such that the magnet array (4) has an essentially rectangular outer circumference.

* * * * *